United States Patent [19]

Leon et al.

[11] Patent Number: 4,755,659
[45] Date of Patent: Jul. 5, 1988

[54] COMBINED BUSBAR AND ELECTRICAL LEAD ASSEMBLY

[75] Inventors: Joseph Leon, Windham; Peter Jones, Londonderry, both of N.H.

[73] Assignee: Chomerics, Inc., Woburn, Mass.

[21] Appl. No.: 10,358

[22] Filed: Feb. 3, 1987

[51] Int. Cl.⁴ .............................................. H05B 3/10
[52] U.S. Cl. .................................. 219/547; 219/203; 219/345; 428/38
[58] Field of Search ............... 219/547, 203, 202, 544, 219/546, 548, 552, 345; 428/38

[56] References Cited

U.S. PATENT DOCUMENTS

| | | | |
|---|---|---|---|
| 3,440,408 | 4/1969 | Brittan | 219/522 |
| 4,078,107 | 3/1978 | Bitterice et al. | 428/38 |
| 4,102,722 | 7/1978 | Shoop | 156/99 |
| 4,412,255 | 10/1983 | Kuhlman et al. | 358/245 |
| 4,415,196 | 11/1983 | Baum et al. | 219/203 X |

Primary Examiner—E. A. Goldberg
Assistant Examiner—M. M. Lateef
Attorney, Agent, or Firm—John Dana Hubbard; William L. Baker

[57] ABSTRACT

An electrically conductive substrate having a conductive layer formed on one surface of the substrate, a busbar and electrical lead assembly is adhesively bonded onto the conductive layer with the electrical lead portion of the assembly being connected to an electrical source or ground. The substrate can be used as a window or viewing screen. The conductive layer can be used as a defogger or as a means for dissipating static electricity or errant electrical emissions.

19 Claims, 2 Drawing Sheets

COMBINED BUSBAR AND ELECTRICAL LEAD ASSEMBLY

This invention relates to an electrically conductive substrate and method of making the same. In particular, the invention relates to an adhesively bonded electrically conductive busbar and lead assembly which completes a circuit between a conductive layer on a window and an electrical power supply or ground.

BACKGROUND OF THE INVENTION

Electroconductive substrates are well known in various industries especially the transportation industry. Probably the best known application is as a window with a defogger element for use on automobiles, airplanes and display freezers. These substrates have also been used on CRT screens and other electronic instruments to control static electricity and errant electrical emissions, as well as flat heaters for industrial and commercial uses.

Generally, the substrates are formed of one or more transparent layers of glass or plastic on at least one surface of which is placed a conductive layer or grid pattern formed of wire, wire mesh, or metal based coatings, such as lacquers paints, or inks. This layer is generally covered by a protective covering such as an adhesive layer and a layer of glass or plastic which are laminated together to form an electroconductive window. Such a window construction is taught by U.S. Pat. No. 4,102,722.

A busbar assembly is formed at the edges of the conductive layer to provide a conductive path through which electricity may flow to or from the conductive layer. These busbars have been formed of conductive coatings which are sintered in place or metallic strips which are soldered in place to the conductive layer and an electrical lead which is separately and sequently soldered on the busbar.

These approaches, especially soldering are time consuming, labor intensive and often result in thermal cracking or spawling of the glass or melting of the plastic. Further, the approaches do not ensure a good contact between the conductive layer and busbar or the busbar and electrical lead, which results in uneven electrical distribution throughout the layer, short circuits or even destruction of the windows. The need has existed for a busbar assembly that was quick and simple to attach, which reduced or eliminated cracking, spawling or melting and which ensured even contact and distribution of electricity to and from the window.

OBJECTS OF THE INVENTION

It is an object of the present invention to provide a one piece, solderless busbar and electrical lead assembly for a window which is inexpensive, easy to install and provides good electrical contact between the window and the electrical power potential.

Another object is to provide an electroconductive window having an electrically conductive layer or grid pattern upon one surface and a busbar and electrical lead assembly which is adhesively bonded to that layer to provide an electrical path to and from the window.

A further object is to provide a method of forming a laminate having a first outer substrate with an inner surface having a layer of electrically conductive elements imposed thereon, a busbar and electrical lead assembly formed of metal foil which is bonded to the edges of the elements by electrically conductive adhesive, the electrical lead having a portion which extends beyond the edge of the first outer substrate and is connected to a power supply and a second outer substrate bonded to the inner surface of the first outer substrate.

The present invention is an electroconductive window and a busbar and electrical lead assembly which is adhesively bonded to an electrically conductive layer or grid pattern on the window. The busbar and electrical lead assembly provides a path for electricity to and from the conductive layer. In particular, the assembly is formed of a metal foil with an electrically conductive adhesive backing on one surface. The adhesive bonds the assembly to the conductive layer.

IN THE DRAWINGS

DETAILED DESCRIPTION

Figure 1:
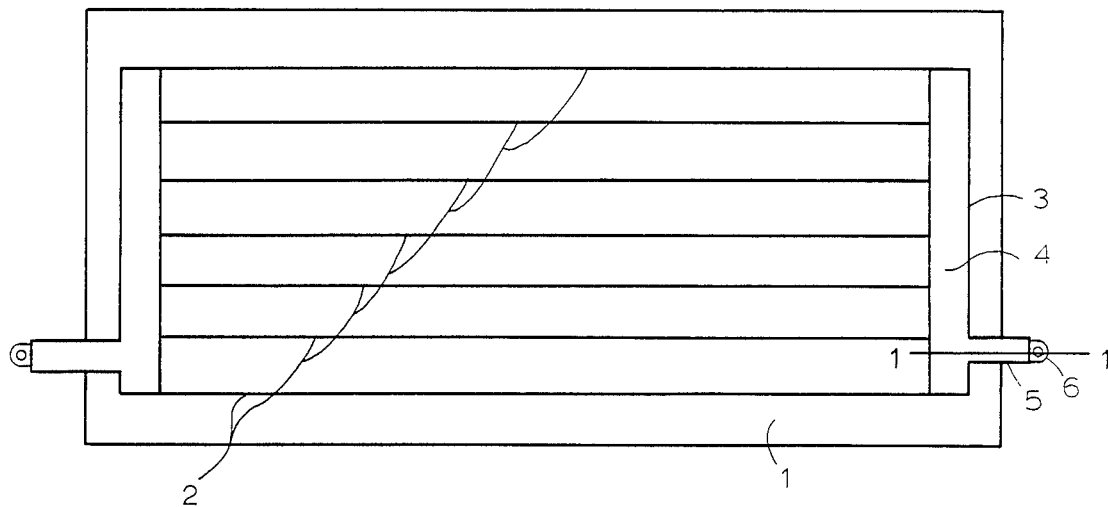
FIG. 1 shows a perspective view of an embodiment of the present invention.

Referring to the drawings, FIG. 1 discloses a perspective view of a preferred embodiment of the present invention.

A substrate 1, preferably transparent and in this embodiment, a window of glass or plastic, has a conductive layer 2 on one surface. The layer 2 has a busbar and lead assembly 3 attached to each of its end portions. The busbar and lead assemblies 3 are adhesively bonded to the layer 2 and the substrate 1 and contain three major portions, the main portion 4, the electrical lead portion 5, and the electrical connection portion 6. When connected to an electrical source and ground, these assemblies complete a circuit through which electricity may flow to either heat the substrate or to remove static electricity from the substrate.

The substrate 1 preferably is a window or viewing screen, though it may have other functions. Preferably, it is formed of a transparent material such as glass, including tempered or safety glass, or plastic, such as an acrylic resin or a polycarbonate resin.

The conductive layer 2 is formed on a surface of the substrate. The layer may be in the form of a continuous coating or in the form of a network or grid. The layer may be formed of wire, wire mesh or conductive films, coatings, paints, lacquers or inks. Suitable wire or wire mesh may be formed of silver, gold, platinum, copper, tungsten, monel or any other thin, electrically conductive metal based materials known in the art.

Other suitable conductive layers include but are not limited to conductive films or coatings and conductive solders, inks, paints and lacquers. Preferably, the conductive layer is formed of metal-based materials containing silver, gold, platinum, copper, tin, iron or mixtures thereof. Silver based materials are more preferred. Such silver filled materials are well known and are commercially available.

If wire or wire mesh is used, the selected material should be sufficiently thin so as to not interfere with the use of the substrate as a window or viewing screen. If desired, the wire or wire mesh may be coated with an anti-reflective material to reduce their visibility on the substrate.

If the conductive layer 2 is in the form of a coating or film, it may be applied to the substrate as a liquid and dried in place or it may be physically attached such as by bonding or melting the substrate and layer together. The layer may also be deposited by other well known methods such as sputter coating, vapor or electrodeposition, soldering or sintering. The coating may be continuous as in a film or formed in lines, grids, or the like which may either extend across the surface of the substrate 1 in a parallel fashion separate from each other or which may be interconnected at the ends so as to form one continuous loop. In the latter case, only one busbar and lead assembly 3 may be required. Regardless of the method employed, the conductive layer must be permanently attached to the substrate, be electrically conductive and have its upper surface free of contaminants or residue which would interfere with the conductivity between the layer 2 and the assembly 3. The busbar and lead assembly 3 is adhered directly to the conductive layer 2 and the lead portion 5 of the assembly 3 extends outwardly beyond the edge of the substrate 1. The end of the lead portion 5 of the assembly farthest from the substrate edge contains a suitable electrical attachment means 6 for connecting the assembly 3 to an electrical source or ground.

Figure 2:
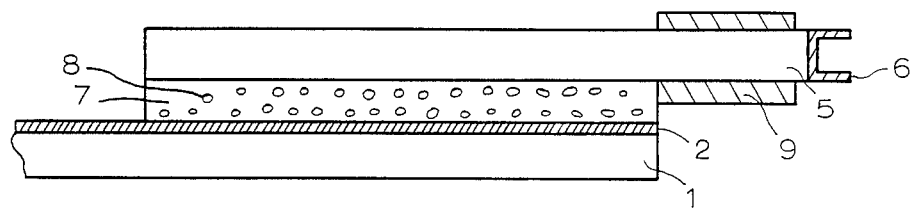
FIG. 2 shows a cross-sectional view of one embodiment of FIG. 1 taken along lines 1—1.

FIG. 2 shows a cross-sectional view of the embodiment of FIG. 1 along the lines 1—1. FIG. 2 shows the substrate 1 having the conductive layer 2 attached to its surface and extending substantially across that surface. The assembly 3 is adhered directly to the end portion of the conductive layer 2.

The busbar and lead assembly 3 is formed of a laminate having at least two layers as shown in FIG. 2. The lower layer is formed of a conductive adhesive and the upper layer is formed of a conductive metal layer.

Preferably, the lower adhesive layer is formed of an adhesive 7 containing a conductive filler 8. Suitable adhesives for the present invention include but are not limited to acrylic, silicone and epoxy adhesives. Preferably the adhesive is pressure sensitive and more preferably it is a pressure sensitive acrylic adhesive.

The conductivity of the adhesive layer is preferably imparted by a conductive filler 8 such as solid metal particles, metal coated particles and non-metallic conductive particles. Conductive particles suitable as filler in the adhesive include but are not limited to solid noble metal particles, preferably gold, silver or platinum, solid non-noble metal particles such as nickel, copper, aluminum, tin, zinc, or iron; metal coated particles, preferably noble metal coated particles such as silver, gold, or platinum coated glass, copper, aluminum, tin, zinc, nickel or carbon; or conductive non-metallic particles such as graphite and carbon black. Preferably, the filler is a noble metal coated particle, more preferably it is silver coated aluminum or copper particles. Noble metal coated particles are preferred because of their high conductivity, low oxidation rate and low cost.

The selected filler particles should have a size of from about 0.0001" to about 0.0140". The amount of conductive filler included in the adhesive should be at least 0.05% by total weight of adhesive and filler, preferably from about 1.0% to about 10.0% and most preferably 5.0%.

The upper layer may be formed of any thin conductive metal layer, though preferably it is formed of a metal foil or film of silver, gold, copper or tinned copper. Most preferably it is formed of tinned copper foil. The selected film or foil should be sufficiently conductive so as to allow a current to pass freely between the conductive adhesive and the electrical source or ground. It should be sufficiently thick and ductile so as to resist tearing or cutting and so as to be self supporting. Preferably, the film or foil is at least 1 mil thick.

The laminate should have a thickness of at least 2 mils, preferably 3 to 10 mils.

The lead portion 5 of the assembly as shown in FIG. 2 extends outwardly from the main portion of the assembly and beyond the edge of the substrate 1. The lead portion may be a continuation of the main portion extending outwardly from the end of the main portion or it may form an arm-like configuration, as shown in FIG. 1, extending outwardly from the main body at an angle, preferably an angle of about 90° to the longest edges of the main portion 4 of the assembly 3. The lead portion may have conductive adhesive on its lower surface, though such an adhesive is not necessary.

At least the section of the lead portion which extends beyond the substrate edge is coated with a non-conductive covering 9. The non-conductive covering prevents short circuits and strengthens the lead portion of the assembly. Preferably, the lead portion is covered with a non-conductive covering from the point on the main portion where the lead portion begins. The non-conductive covering however should not extend to any portion of the assembly which contacts the conductive layer 2 of the substrate 1. Suitable non-conductive coverings include silicone rubbers, thermoplastics and thermosets. The covering can be dipped, sprayed, coated or wrapped onto the lead portion. Preferably the covering is a heat shrinkable tube which is fitted over the lead portion and shrunk in place.

The busbar and lead assembly 3 can be formed by several methods.

One preferred method is form a large sheet of laminate material having the lower layer of conductive adhesive and the upper layer of metal foil or film. Such a laminate can be formed by coating the metal foil or film with the selected conductive adhesive, covering the exposed adhesive with a release sheet of paper or plastic and subjecting the sheet to pressure, either through a pair of rollers or in a press. The application of pressure ensures a permanent bond between the upper metal and lower adhesive layer. The busbar and lead assembly is then cut out of the sheet in the desired shape. The lead portion of the assembly is then coated with a non-conductive layer and if desired, a suitable electrical connector can be attached to the lead portion at this time.

An alternative method of making the assembly is to precut the metal layer of the laminate into the desired shape and then coat the adhesive layer onto the main portion of the assembly, leaving the lead portion uncoated. The adhesive is then covered by a release sheet and subjected to pressure. The lead portion is then covered by a non-conductive coating and if desired attached to a suitable electrical connector.

Another method of forming the assembly is to use a premade conductive tape, such as Cho-Foil ® brand conductive tape (Cho-Foil ® is a registered trademark of Chomerics, Inc.), cut it to length, apply a non-conductive layer to the lead portion and attach an electrical connector to the end of the lead portion. Use of the premade tape is simpler and easier than the other methods, however one is limited in selecting the design of the assembly and location of the lead portion.

The assembly by whatever method it is formed, can then be applied to the conductive layer 2 of the substrate, by simply removing the release sheet, aligning the assembly over the desired point of contact, preferably at the end of the conductive layer adjacent an edge of the substrate and adhering the assembly to that point of contact. Preferably, the assembly once in position is subjected to slight pressure, such as by a hand roller, to ensure a good bond between the assembly and the substrate.

Figure 3:
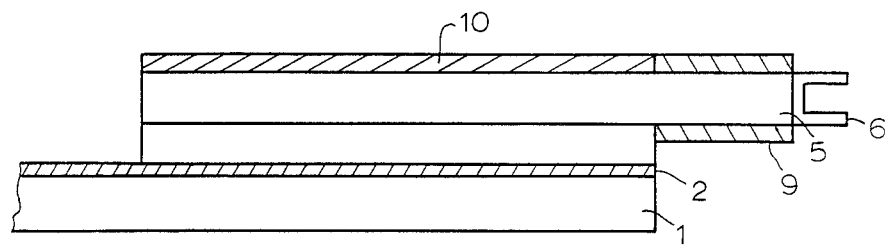
FIG. 3 shows a cross-sectional view of an embodiment of the present invention.

FIG. 3 shows another preferred embodiment of the present invention. The substrate 1 and busbar and lead assembly 3 are identical to those discussed above in relation to FIGS. 1 and 2. This embodiment also contains an optional coating 10 on top of the metal foil layer of the main portion of the assembly 3. This coating may be decorative or functional or preferably both. Preferably the coating 10 is used to protect the surface of the metal foil from damage or oxidation as well as to prevent any short circuits which might occur if a conductive metal were to come into contact with the assembly. The coating 10 can be formed of any non-conductive, resilient material such as rubber, natural or synthetic, elastomeric or semi-elastomeric thermoplastics and thermosetting plastics. A more preferred coating is in the form of a film which is permanently attached to the metal foil surface by bonding, melting, evaporation deposition, etc. Preferred films include but are not limited to various non-conductive but tough materials such as Mylar ®, Tedlar ® and Kapton ® films. (Mylar, Tedlar and Kapton are registered trademarks of E. I. Dupont de Nemours).

Figure 4:
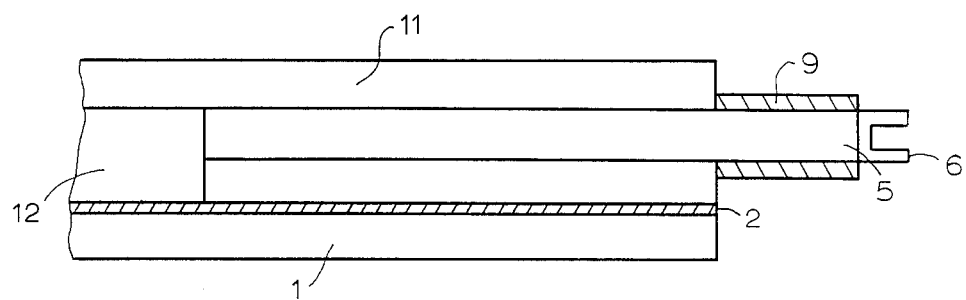
FIG. 4 shows a cross-sectional view of another embodiment of the present invention.

An alternative embodiment to that shown in FIG. 3 is shown in FIG. 4 wherein a second substrate 11 is attached to the first substrate 1 so as to sandwich the conductive layer 2 and the busbar and lead assembly 3 between the two substrates 1 and 11. The second substrate 11 may be made of the same material as the first substrate or may be made of another material which is preferably transparent and compatible with the first substrate, conductive layer 2 and assembly 3. The second substrate 11 may be of the same thickness as the first substrate or thicker or thinner depending upon choice. The second substrate may also be a thin coating or film which is non-conductive and resistant to injury. Such coatings may be applied as a liquid or solid and include plastics such as acrylate resins, and lacquers, varnishes and other such materials well known in the art. Films include but are not limited to various plastic films such as Mylar ® film, Kapton ® film, Tedlar ® film and the like. Whatever form the second substrate 11 takes, it should be permanently attached to the first substrate, preferably bonded to the first substrate so as to form a laminate and should cover at least the entire conductive layer, preferably the entire first substrate. If desired an intermediate layer 12 may be imposed to cover the conductive layer and act as a bonding agent between the two substrates. One well known bonding agent suitable for use in the present invention is polyvinyl butyral.

The present invention has been disclosed in reference to its preferred embodiment, namely its use as a defroster, or static electricity shield on a window or viewing screen. It is also contemplated and within the scope of the invention to use the present invention in other industries. For example, the present invention may be used as a flat heating system. Additionally, it may be used in any application wherein a flat, easily applied electrical connection is required or desired.

Further, while this invention has been described with reference to its preferred embodiments, other embodiments can achieve the same result. Variations and modifications of the present invention will be obvious to those skilled in the art and is intended to cover in the appended claims all such modifications and eqivalents as fall within the true spirit and scope of this invention.

What we claim is:

1. A busbar and electrical lead for use on electrically conductive substrates comprising a main, rectangular portion and an arm-like portion extending substantially perpendicular away from the main portion, the main portion forming the busbar, the arm-like portion forming the electrical lead, the main busbar portion having one surface coated with an electrically conductive pressure sensitive adhesive, the arm-like electrical lead portion being covered by an electrically insulating material and having an electrical connector attached at an end furthermost from the main portion of the busbar.

2. A busbar and electrical lead of claim 1 wherein the busbar and electrical lead are formed of electrically conductive metal foil.

3. A busbar and electrical lead of claim 1 wherein the pressure sensitive adhesive is an acrylic adhesive filled with electrically conductive fillers.

4. A busbar and electrical lead of claim 2 wherein the metal foil is selected from the group consisting of gold, silver, nickel, aluminum copper and tinned copper.

5. An electroconductive, laminate comprising a first outer substrate having a substantially planar inner surface, an electrically conductive layer directly in contact with the inner surface of the first outer substrate, a busbar assembly bonded to the layer, the busbar having an electrical lead which extends beyond an edge of the first outer substrate and is electrically connected to an electric power supply, and a second outer substrate attached to the inner surface of the first outer substrate.

6. The laminate of claim 5 wherein the first and second outer substrates are selected from the group consisting of glass, transparent thermoplastics and transparent thermosetting resins.

7. The laminate of claim 5 wherein the busbar is formed of a single metal foil element, the busbar having an electrically conductive adhesive on a surface which mates with the inner surface of first outer substrate and the electrical lead of the busbar which extends beyond the edge of the first outer surface being free of adhesive.

8. The laminate of claim 7, wherein the metal foil is selected from the group consisting of gold, silver, nickel, copper, tinned copper and aluminum, and the electrically conductive adhesive is a pressure sensitive acrylic adhesive filled with electrically conductive particles.

9. The laminate of claim 7 wherein the electrical lead of the busbar which extends beyond the edge of the first outer substrate is covered with an electrically nonconductive material, and a surface of the busbar opposite the surface coated with the adhesive is coated with a dielectric material.

10. A method of forming an electrically conductive substrate comprising the steps of forming an electrically conductive layer on a first surface of a substrate, placing a busbar having a main portion and an electrical lead portion on an outer edge of the conductive layer, bonding the main portion of the busbar to the conductive layer with an electrically conductive adhesive to form an electrical path from the layer to the busbar, extending the electrical lead portion in a plane parallel to the first surface and beyond an outer edge of the substrate, and covering the first surface of the substrate with a protective coating.

11. The method of claim 10 wherein the conductive layer is formed of metallic materials selected from the group consisting of wire, wire mesh, metal-filled lacquers, metal-filled paints metal-filled inks and, metal-filled films; the substrate is selected from the group consisting of glass and transparent plastics; the busbar is formed of a metallic foil selected from the group consisting of gold, silver, nickel, copper, tinned copper and aluminum; and the protective coating is selected from the group consisting of glass, transparent plastic sheets, transparent plastic resins and lacquers.

12. The method of claim 10 wherein the electrically conductive adhesive is formed of a pressure sensitive acrylic adhesive filled with electrically conductive particles.

13. The method of claim 10 further comprising the step of attaching an electrical connector to an end of the electrical lead portion extending beyond the outer edge or the substrate.

14. A window comprising a transparent substrate having a substantially planar inner surface, an electrically conductive layer directly in contact with the substantially planar inner surface of the transparent substrate, an electrically conductive busbar assembly formed of a conductive tape having an upper layer of metal foil and a lower layer of conductive adhesive, the busbar assembly having a main body portion and an electrical lead portion, the electrical lead portion extending outwardly from the main body portion, the busbar assembly being adhered to the electrically conductive layer adjacent an edge of the transparent substrate so that the main body portion is in electrical contact with the electrically conductive layer and the electrical lead portion extends beyond the edge of the transparent substrate.

15. The window of claim 14, wherein the transparent substrate is selected from the group consisting of glass, transparent thermoplastics and transparent thermosetting resins; the electrically conductive layer is selected from the group consisting of wire, wire mesh, metal-based coatings, metal-based films, metal-based lacquers, metal-based paints, and metal-based inks; the metal foil of the upper layer of the busbar assembly is selected from the group consisting of gold, silver, nickel, copper, tinned copper and aluminum and the conductive adhesive of the lower layer of the busbar assembly is selected from the group consisting of acrylic, silicone and epoxy adhesives filled with electrically conductive fillers.

16. A window of claim 14 further comprising an electrically insulating covering on the electrical lead of the busbar which extends beyond the edge of the transparent substrate.

17. A window of claim 14 further comprising a second transparent substrate attached to the first substrate so as to cover the electrically conductive layer and busbar assembly.

18. A window of claim 17 wherein the second transparent substrate is a protective layer selected from the group consisting of rubber, natural or synthetic, elastomeric or semi-elastomeric thermoplastics and thermosetting plastics.

19. A window of claim 17 wherein the second transparent substrate is selected from the group consisting of glass, tempered glass, thermoplastics and thermosetting resins.

* * * * *